(12) United States Patent
Kobayashi

(10) Patent No.: US 9,423,754 B2
(45) Date of Patent: Aug. 23, 2016

(54) IMAGE FORMING APPARATUS

(71) Applicant: KYOCERA Document Solutions Inc., Osaka-shi, Osaka (JP)

(72) Inventor: Yasuyoshi Kobayashi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/653,250

(22) PCT Filed: Apr. 17, 2014

(86) PCT No.: PCT/JP2014/060915
§ 371 (c)(1),
(2) Date: Jun. 17, 2015

(87) PCT Pub. No.: WO2014/175157
PCT Pub. Date: Oct. 30, 2014

(65) Prior Publication Data
US 2015/0331381 A1      Nov. 19, 2015

(30) Foreign Application Priority Data

Apr. 26, 2013 (JP) ................................ 2013-093713

(51) Int. Cl.
*H04N 1/04* (2006.01)
*G03G 15/00* (2006.01)
(Continued)

(52) U.S. Cl.
CPC ............... *G03G 15/60* (2013.01); *G03G 15/80* (2013.01); *H04N 1/00* (2013.01); *H04N 1/00907* (2013.01);
(Continued)

(58) Field of Classification Search
None
See application file for complete search history.

(56) References Cited

U.S. PATENT DOCUMENTS

2002/0117318 A1* 8/2002 Suzuki ................... H04B 15/00
                                                                174/51
2002/0131068 A1* 9/2002 Ishii ..................... B41J 2/17506
                                                                358/1.14
(Continued)

FOREIGN PATENT DOCUMENTS

CN          101329529 A      12/2008
CN          102686079 A       9/2012
(Continued)

OTHER PUBLICATIONS

ISA Japanese Patent Office, International Search Report Issued in Patent Application No. PCT/JP2014/060915, Jul. 22, 2014, WIPO, 4 pages.

(Continued)

*Primary Examiner* — Huo Long Chen
(74) *Attorney, Agent, or Firm* — Alleman Hall McCoy Russell & Tuttle LLP

(57) ABSTRACT

A flat cable (301) is disposed along a direction of reciprocating movement of a carriage (122), and is configured to input a synchronization signal to a board mounted on the carriage (122). A conductive plate (311) is supported by a casing (331) such that, when portions of the flat cable (301) face each other as a result of the flat cable (301) being bent according to the reciprocating movement of the carriage (122), the conductive plate (311) is interposed between the facing portions of the flat cable (301). An elastic member (312) is configured to electrically connect the conductive plate (311) and a ground member (321), and has a substantial inductance component that absorbs vibration generated in an image forming portion (140) or an image reading portion (120).

6 Claims, 7 Drawing Sheets

(51) Int. Cl.
   *H04N 1/10*    (2006.01)
   *H04N 1/00*    (2006.01)

(52) U.S. Cl.
   CPC ............ *H04N 1/00994* (2013.01); *H04N 1/04* (2013.01); *H04N 1/1061* (2013.01); *H04N 2201/0094* (2013.01)

(56) References Cited

U.S. PATENT DOCUMENTS

| | | | |
|---|---|---|---|
| 2002/0171880 | A1 | 11/2002 | Yui et al. |
| 2008/0317498 | A1* | 12/2008 | Andoh .................. G03G 15/60 399/110 |
| 2011/0211234 | A1* | 9/2011 | Kozaki ............... H04N 1/00559 358/474 |
| 2012/0230005 | A1 | 9/2012 | Ota |

FOREIGN PATENT DOCUMENTS

| | | | |
|---|---|---|---|
| JP | 02100567 | A | 4/1990 |
| JP | 04018847 | A | 1/1992 |
| JP | 2000309139 | A | 11/2000 |
| JP | 2002247291 | A | 8/2002 |
| JP | 2002344703 | A | 11/2002 |
| JP | 2002368476 | A | 12/2002 |
| JP | 2003220740 | A | 8/2003 |
| JP | 2005057628 | A * | 3/2005 |
| JP | 2006015509 | A | 1/2006 |
| JP | 2006154076 | A | 6/2006 |
| JP | 2008278366 | A | 11/2008 |
| JP | 2009092790 | A | 4/2009 |
| JP | 2010200231 | A | 9/2010 |
| JP | 2012189813 | A | 10/2012 |

OTHER PUBLICATIONS

ISA Japanese Patent Office, Written Opinion Issued in Patent Application No. PCT/JP2014/060915, Jul. 22, 2014, WIPO, 7 pages.

* cited by examiner

IMAGE FORMING APPARATUS

TECHNICAL FIELD

The present invention relates to an image forming apparatus including an image reading portion configured to read a document image, and an image forming portion configured to print the document image read by the image reading portion onto a receiving material.

BACKGROUND ART

Conventionally, a configuration for use as an image reading mechanism in a copier, a facsimile machine, a scanner or a multifunction peripheral is known in which a movable carriage is provided below a document platen (contact glass). With such an image reading mechanism, an image of a document placed on the document platen with the side to be read facing down on the document platen can be read by moving the carriage.

A document reading light source that applies light to the document is mounted to the carriage. In an image reading mechanism that uses a contact optical system, an image sensor for reading a document image (e.g., a complementary metal oxide semiconductor (CMOS) image sensor) is also mounted to the carriage. Power, a synchronization signal and the like need to be transmitted to the carriage, and thus the carriage is connected to the main apparatus, which is a supply source of the power, the synchronization signal and the like, with a flexible flat cable.

Meanwhile, with the recent wide spread use of electronic devices, there is an increasing demand for image forming apparatuses such as multifunction peripherals to have electromagnetic non-interference, or in other words, image forming apparatuses are required to not cause electromagnetic interference (EMI) that impedes the operations of other devices by emission of electromagnetic waves such as radiation noise during operation of the image forming apparatuses. The flexible flat cable mentioned above has a structure in which conductors having a rectangular cross section that are arranged in parallel are disposed between upper and lower plastic films, and the plastic films are heat-sealed. For this reason, the flexible flat cable easily emits electromagnetic waves and easily receives incident electromagnetic waves. To address this problem, various techniques have been proposed (see, for example, PTLs 1 and 2).

For example, a configuration that prevents a reduction in the amount of current caused by mutual inductance (electromagnetic coupling) between a plurality of flexible flat cables by inserting a metal film between the flexible flat cables is known as a first related technique (e.g., PTL 1, etc.). Note that the metal film is grounded.

Another configuration is also known as a second related technique (e.g., PTL 2, etc.) in which a plurality of flat cables are overlapped, at least part of the cable wires of each flat cable are alternately allocated to a signal wire and a ground wire, and at least part of the cable wires between adjacent flat cables are disposed such that a signal wire and a ground wire face each other.

CITATION LIST

Patent Literature

[PTL 1] Japanese Laid-Open Patent Publication No. 2003-220740

[PTL 2] Japanese Laid-Open Patent Publication No. 2002-344703

SUMMARY OF THE INVENTION

Problems to be Solved by the Invention

The first related technique and the second related technique described above are configured to suppress emission of electromagnetic waves with the use of grounded conductors such as metal films and ground wires. However, the first related technique is intended to suppress electromagnetic interference with an adjacent flexible flat cable, and is not intended to suppress interference with external devices such as other devices. For example, a configuration may be conceivable that suppresses emission of electromagnetic waves (radiation noise) to the outside by providing metal films on both sides of the flexible flat cable. However, such a configuration compromises flexibility, which is a feature of the flexible flat cable. The above-described image reading mechanism makes it difficult for the flexible flat cable to be bent, thus possibly causing a serious problem that the speed of movement of the carriage varies depending on the degree of bending of the flexible flat cable.

In the second related technique, the signal wire is surrounded by the ground wire, and this is similar to the structure of a coaxial shield cable. Thus, the second related technique is considered to be suitable to suppress radiation noise. However, miniaturized flexible flat cables available in recent years are required to have very high positioning accuracy to achieve such a structure. Accordingly, the flexible flat cables having such a structure are inevitably expensive.

On the other hand, an image forming apparatus including an image reading portion configured to read a document image and an image forming portion configured to print the document image read by the image reading portion onto a receiving material is configured such that a ground member such as a sheet metal (chassis) having a large area is disposed in the image forming portion where a large space can be relatively easily secured, and the ground potential that is needed by the image reading portion is also implemented by a connection with the ground member. However, if the member (e.g., metal plate) that requires grounding in the image reading portion and the ground member of the image forming portion are firmly coupled by screwing or the like, vibration caused by the image forming operation of the image forming portion may propagate to the image reading portion, resulting in a low image reading quality, or vibration caused by the image reading operation such as movement of the carriage may propagate to the image forming portion, resulting in a low image forming quality. For this reason, the image forming portion and the image reading portion are usually coupled, with propagation of vibration being suppressed. Under this circumstance, it has been difficult to place a stable ground potential near the flexible flat cable, which is the source of radiation noise in the image reading portion, and suppress radiation noise.

The present invention has been made in view of such conventional circumstances, and it is an object of the present invention to provide an image forming apparatus that can suppress radiation noise with the use of a relatively simple configuration.

Solution to the Problems

An image forming apparatus according to one aspect of the present invention includes: an image reading portion configured to read a document image; and an image forming portion configured to print the document image read by the image reading portion onto a receiving material. The image forming portion includes a conductive ground member. The image reading portion includes a non-conductive casing, a carriage, a flat cable, a conductive plate, and an elastic member. The non-conductive casing is configured to support a document platen on which a document is placed. The carriage is accommodated in the casing, and is provided so as to be capable of reciprocating movement with respect to the document platen. The flat cable is disposed along a direction of the reciprocating movement of the carriage, and is configured to input a synchronization signal into a board mounted on the carriage. The conductive plate is supported by the casing such that, when portions of the flat cable face each other as a result of the flat cable being bent according to the reciprocating movement of the carriage, the conductive plate is interposed between the facing portions of the flat cable. The elastic member is configured to electrically connect the conductive plate and the ground member, and has a substantial inductance component that absorbs vibration generated in the image forming portion or the image reading portion.

Advantageous Effects of the Invention

According to the present invention, it is possible to suppress radiation noise generated by a flat cable included in an image reading portion.

DESCRIPTION OF EMBODIMENTS

Hereinafter, an embodiment of the present invention will be described in further detail with reference to the drawings. In the following description, the present invention will be embodied as a digital multifunction peripheral that includes an image reading portion.

The present inventor conducted in-depth studies on a method for suppressing radiation noise caused by a flexible flat cable included in an image reading portion of an image forming apparatus that includes the image reading portion and an image forming portion, and arrived at the present invention. The present invention has been accomplished based on the finding of the present inventor that the state of radiation noise varies depending on the connection structure between a metal plate disposed near the flexible flat cable and a ground member disposed in the image forming portion.

Figure 1:
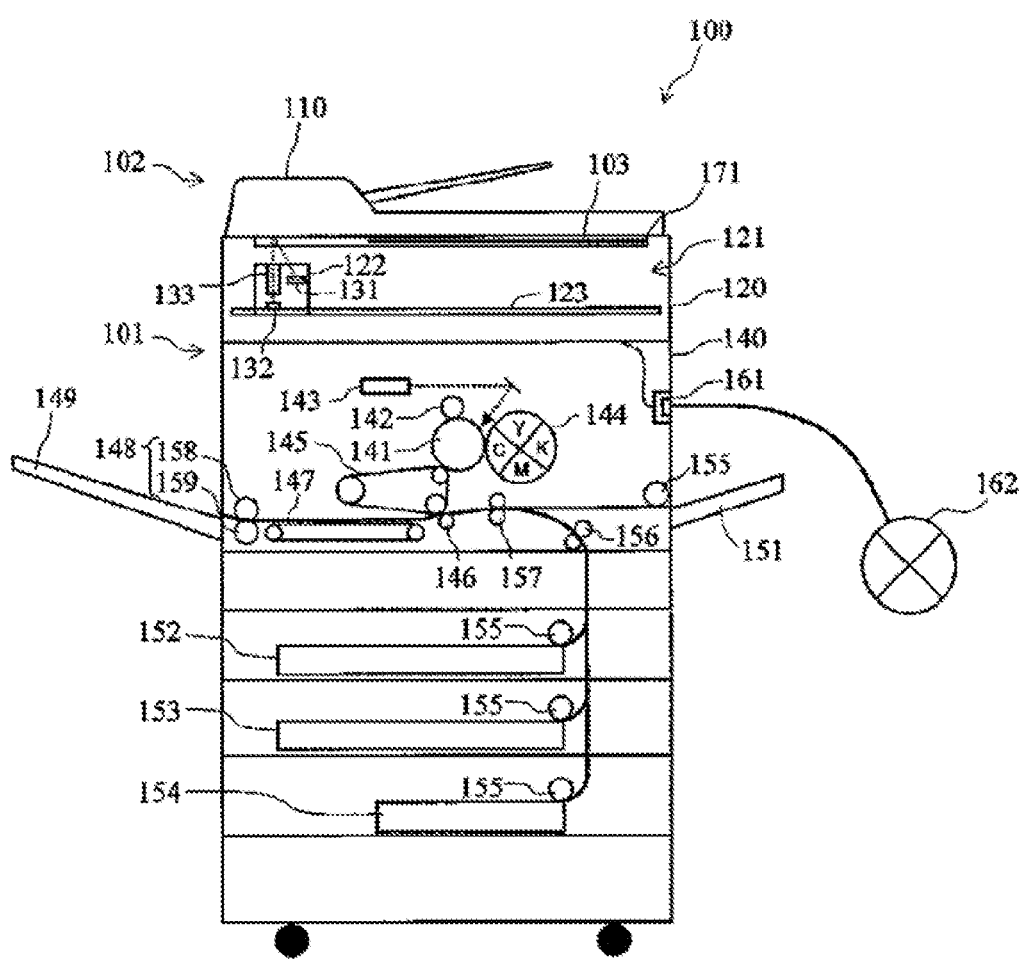
FIG. 1 is a schematic configuration diagram showing an overall configuration of a multifunction peripheral according to an embodiment of the present invention.

FIG. 1 is a schematic configuration diagram showing an example of an overall configuration of a digital multifunction peripheral according to the present embodiment. As shown in FIG. 1, a multifunction peripheral 100 includes: a main body 101 including an image reading portion 120 and an image forming portion 140; and a platen cover 102 attached on top of the main body 101. A document platen 103 made of a transparent plate such as a contact glass plate is provided on the upper surface of the main body 101, and the document platen 103 is configured to be opened and closed by the platen cover 102. The platen cover 102 includes a document feeder 110. On the front side of the multifunction peripheral 100, an operation panel 171 is provided that allows the user to give an instruction to start copying or other instructions to the multifunction peripheral 100, or to check the state and settings of the multifunction peripheral 100.

The image reading portion 120 is provided below the document platen 103. The image reading portion 120 reads a document image by using a scanning optical system 121, and generates digital data (image data) of the image. In the present embodiment, the scanning optical system 121 is configured as a contact optical system (so-called contact image sensor (CIS)) although no particular limitations are imposed thereon. The document to be read can be placed on the document platen 103 or the document feeder 110.

The scanning optical system 121 includes a carriage 122 and a guide 123. The carriage 122 includes a linear light source 131, an image sensor 132, and an equal-magnification optical system lens 133. In the present embodiment, an LED array, a CMOS line image sensor, and a gradient index lens are used as the light source 131, the image sensor 132, and the equal-magnification optical system lens 133, respectively. For example, the light source 131 applies red (R) light, green (G) light and blue (B) light to the document. The equal-magnification optical system lens 133 forms light (optical image) reflected by the document onto the light receiving surface of the image sensor 132.

The guide 123 is disposed on mutually facing side surfaces of the main body 101 so as to be parallel to the document platen 103. The carriage 122 is provided so as to be capable of reciprocating movement along the guides 123. The movement of the carriage 122 is implemented by driving of a driving portion (not shown). In the present embodiment, a stepping motor serving as the driving portion drives the carriage 122.

The guide 123 is provided such that the image sensor 132 mounted on the carriage 122 can be moved at least from one end to the other of a document placement region (document readable region) in the document platen 103. In the present embodiment, the size of the document platen 103 matches that of the document placement region, so that the image sensor 132 can be moved from one end to the other of the document platen 103 that is orthogonal to the side surfaces of the main body 101 where the guides 123 are provided. That is, in the scanning optical system 121, an image of a document placed on the document platen 103 can be read by the image sensor 132 as a result of the carriage 122 being moved along the guide 123. In the case of reading an image of a document set in the document feeder 110, the image reading portion 120 temporarily fixes the carriage 122 at an image reading position, and the image of the document that passes through the image reading position is read by the image sensor 132. The image sensor 132 generates, from the optical image incident on the light receiving surface, image data of the document corresponding to, for example, each of red (R), green (G) and blue (B). The generated image data can be printed onto a sheet in the image forming portion 140. The generated image data can also be transmitted to other devices (not shown) via a network 162 by a network interface 161.

The carriage 122 is provided with a control board for controlling the emission of light of the LED array serving as the light source 131 and the CMOS line image sensor serving as the image sensor 132, and data acquisition. A flat cable, which will be described later, is connected to the board. A synchronization signal (clock signal) for controlling the timing of power supply to the board, the timing of light emission, and the timing of data acquisition is input via the flat cable.

The image forming portion 140 prints image data generated by the image reading portion 120, or image data received from other devices connected to the network 162, onto a sheet (receiving material). The image forming portion 140 includes a photosensitive drum 141. The photosensitive drum 141 rotates in one direction at a constant speed. A charger 142, an exposure portion 143, a developer 144, and an intermediate transfer belt 145 are disposed around the photosensitive drum 141 in order from the upstream side of the rotation direction. The charger 142 uniformly charges the surface of the photosensitive drum 141. The exposure portion 143 applies light onto the surface of the uniformly charged photosensitive drum 141 according to the image data, thus forming an electrostatic latent image on the photosensitive drum 141. The developer 144 causes toner to adhere to the electrostatic latent image to form a toner image on the photosensitive drum 141. The intermediate transfer belt 145 transfers the toner image formed on the photosensitive drum 141 onto a sheet. When the image data is a color image, the intermediate transfer belt 145 transfers toner images of respective colors onto the same sheet. An RGB color image is converted to cyan (C) image data, magenta (M) image data, yellow (Y) image data and black (K) image data, and image data of respective colors are input into the exposure portion 143.

The image forming portion 140 feeds a sheet from a manual feed tray 151, a sheet feed cassette 152, 153, 154 or the like to a transfer portion provided between the intermediate transfer belt 145 and a transfer roller 146. Sheets of various sizes can be placed or accommodated in the manual feed tray 151 and the sheet feed cassettes 152, 153 and 154. The image forming portion 140 selects a sheet designated by the user or a sheet having the size of the document that has been automatically detected, and feeds the selected sheet from the manual feed tray 151 or the cassette 152, 153 or 154 with the use of feed rollers 155. The fed sheet is conveyed to the transfer portion by conveyance rollers 156 and registration rollers 157. The sheet onto which a toner image has been transferred is conveyed to a fixing device 148 by a conveyance belt 147. The fixing device 148 includes a fixing roller 158 with a built-in heater and a pressure roller 159, and fixes the toner image onto the sheet by application of heat and pressing force. The image forming portion 140 discharges the sheet that has passed through the fixing device 148 to a discharge tray 149.

Figure 2:
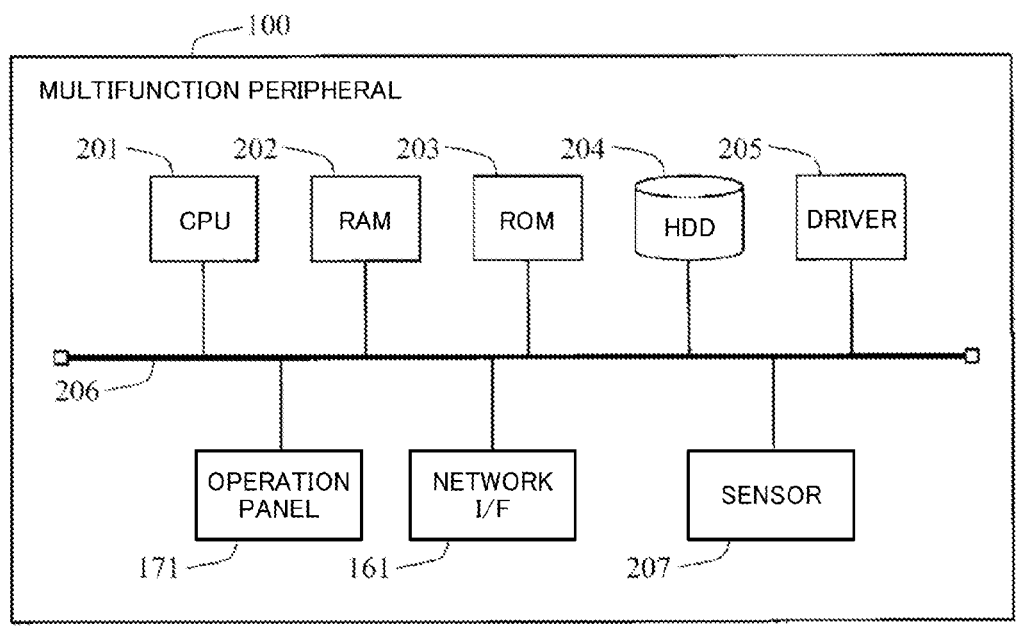
FIG. 2 is a diagram showing a hardware configuration of the multifunction peripheral according to an embodiment of the present invention.

FIG. 2 is a hardware configuration diagram of a control system of the multifunction peripheral. In the multifunction peripheral 100 of the present embodiment, a central processing unit (CPU) 201, a random access memory (RAM) 202, a read only memory (ROM) 203, a hard disk drive (HDD) 204, and a driver 205 that serves as driving portions of the document feeder 110, the image reading portion 120, the image forming portion 140 are connected via an internal bus 206. The ROM 203, the HDD 204 and the like store programs therein. The CPU 201 controls the multifunction peripheral 100 in accordance with a command from a control program stored in the ROM 203, the HDD 204 or the like. For example, the CPU 201 uses the RAM 202 as a work area, and controls the operations of the driving portions by exchanging data and instructions with the driver 205. Also, the HDD 204 is used to store image data obtained by the image reading portion 120 and image data revived by the network interface 161 from other devices via a network.

The internal bus 206 is also connected to the operation panel 171 and various sensors 207. The operation panel 171 accepts a user operation and supplies a signal based on the operation to the CPU 201. The operation panel 171 also displays an operation screen on a display provided in the operation panel 171 in accordance with a control signal from the CPU 201. The sensors 207 include various types of sensors such as a sensor for detecting opening or closing of the platen cover 102, a sensor for detecting a document on the document platen 103, a temperature sensor of the fixing device 148, and a sensor for detecting a sheet or document being conveyed. The CPU 201 controls the operations of the constituent portions in accordance with the signals from the sensors by executing a program stored in, for example, the ROM 203.

Figure 3:
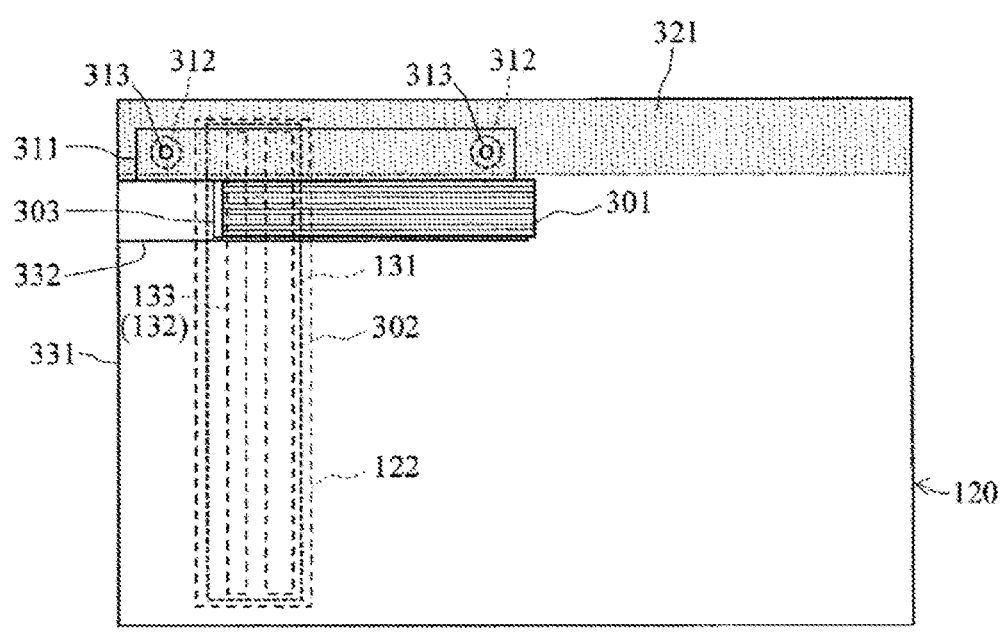
FIG. 3 is a schematic diagram showing an example of a radiation noise suppression structure according to an embodiment of the present invention.
Figure 4:
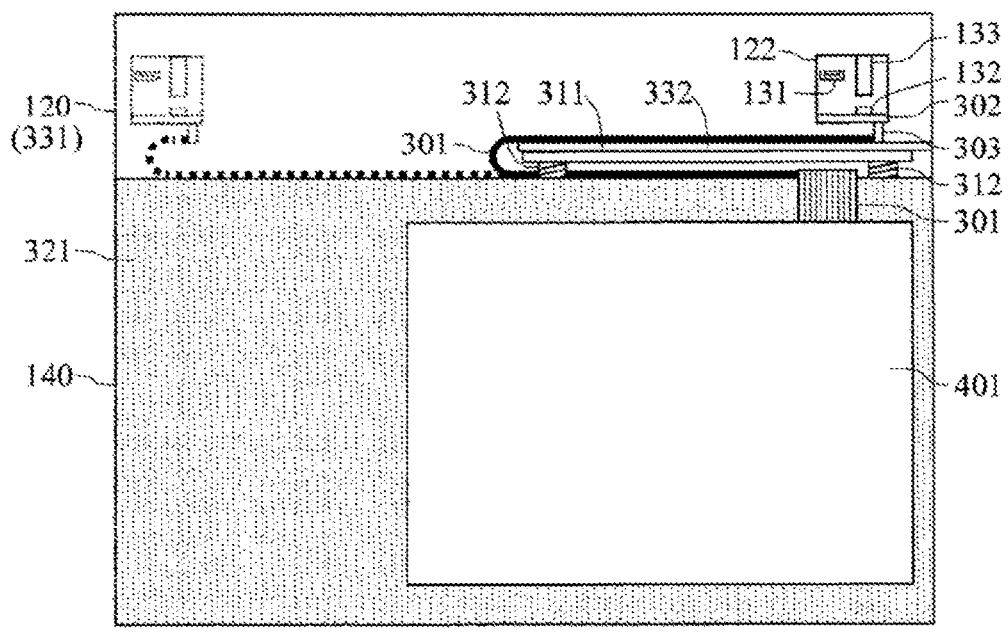
FIG. 4 is a schematic diagram showing an example of the radiation noise suppression structure according to an embodiment of the present invention.

FIGS. 3 and 4 are diagrams showing an example of arrangement of the aforementioned flat cable. FIG. 3 is a schematic diagram of the multifunction peripheral 100 as viewed from above. For the sake of convenience of description, the platen cover 102, the document platen 103, and the upper wall of the casing of the image reading portion 120 that supports the document platen 103 are not illustrated. Also, the carriage 122 and the light source 131 and the like mounted on the carriage 122 are indicated by broken lines. Meanwhile, FIG. 4 is a schematic diagram of the multifunction peripheral 100 as viewed from the back. For the sake of convenience of description, the rear walls of the casings of the image reading portion 120 and the image forming portion 140 are not illustrated.

As shown in FIGS. 3 and 4, a flat cable 301 is disposed along the direction of reciprocating movement of the carriage. The flat cable 301 connects a board 302 (indicated by a dotted line in FIG. 3) provided on the bottom side of the carriage 122 and a main controller board 401 on which the aforementioned CPU 201 and the like are mounted.

As shown in FIG. 4, the main controller board 401 is mounted on the image forming portion 140. As described above, a motor that drives the photosensitive drum 141 and the like, the charger 142 that generates a high voltage, and the like are accommodated in the image forming portion 140, and thus there is a possibility of the occurrence of an erroneous operation due to noise entering digital circuitry on the main controller board 401. Accordingly, in the image forming portion 140, a box-shaped casing 321 that is made of a conductive metal and accommodates digital circuitry such as the main controller board 401 is provided in a region separate from the region where the above-mentioned motor and the charger 142 are accommodated. In the present embodiment, as shown in FIG. 3, the casing 321 is provided on the rear side of the image forming portion 140, and the main controller board 401 is disposed within the casing 321. Also, the casing 321 is grounded and functions as a ground member as well. A ground wire on the main controller board 401 is electrically connected to the casing 321.

The flat cable 301 has a structure in which a plurality of metal conductors having a rectangular cross section that are arranged in parallel are disposed between upper and lower plastic films, and the plastic films are heat-sealed. One end of the flat cable 301 is connected to a connector (not shown) provided on the main controller board 401. The other end of the flat cable 301 is connected to a connector 303 provided on the undersurface side of the board 302.

The flat cable 301 that is drawn upward from the main controller board 401 onto the bottom of the casing 331 of the image reading portion 120 is bent on the bottom of the casing 331 and disposed on the bottom of the casing 331 along the direction of reciprocating movement of the carriage 122. Although no particular limitations are imposed, in the present embodiment, a standby position (so-called home position) of the carriage 122 when it is waiting for image reading is located substantially directly above the position where the flat cable 301 is drawn from the main controller board 401. Accordingly, in the standby state, the flat cable 301 is bent in U shape at an intermediate position of the range of reciprocating movement of the carriage 122, and the flat cable 301 from the intermediate position to the other end is connected to the connector 303 by passing above a portion of the flat cable 301 that is disposed on the bottom of the casing 331.

Also, a position corresponding to the image reading position at which the carriage 122 is temporarily fixed when the document feeder 110 is used is also located near the home position, and thus the flat cable 301 is disposed in the same manner as shown in FIGS. 3 and 4. The flat cable 301 from the position at which the cable is drawn onto the bottom of the casing 331 to the above-described intermediate position is fixed to the bottom of the casing 331, so that the position of the flat cable 301 does not vary with the movement of the carriage 122.

With this configuration, when, for example, a document having the same size as the document placement region is placed on the document platen 103 so as to be read, the carriage 122 is moved to a position farthest from the above-described standby position (indicated by a dotted line in FIG. 4). At this time, the position at which the flat cable 301 is bent moves together with the movement of the carriage 122.

In the multifunction peripheral 100 of the present embodiment, as shown in FIG. 4, a conductive plate 311 is provided that, when portions of the flat cable 301 face each other, is interposed between the facing portions of the flat cable. The conductive plate 311 is supported by the casing 331 of the image reading portion 120. In the present embodiment, the casing 331 is made of a non-conductive material such as resin, and the conductive plate 311 is supported by a supporting member 332 that is made of resin and extends from an inner wall of the casing 331. Note that the supporting member 332 may be a member separate from the casing 331.

As shown in FIGS. 3 and 4, the supporting member 332 is a plate-shaped member that has a rectangular shape in plan view and whose lengthwise direction corresponds to the direction of reciprocating movement of the carriage 122. The width extending in the transverse direction is slightly wider than that of the flat cable 301, and thus the entire width of the flat cable 301 is disposed on the supporting member 332. Also, in the present embodiment, the conductive plate 311 is disposed so as to extend across the entire transverse direction of the supporting member 332.

Figure 5:
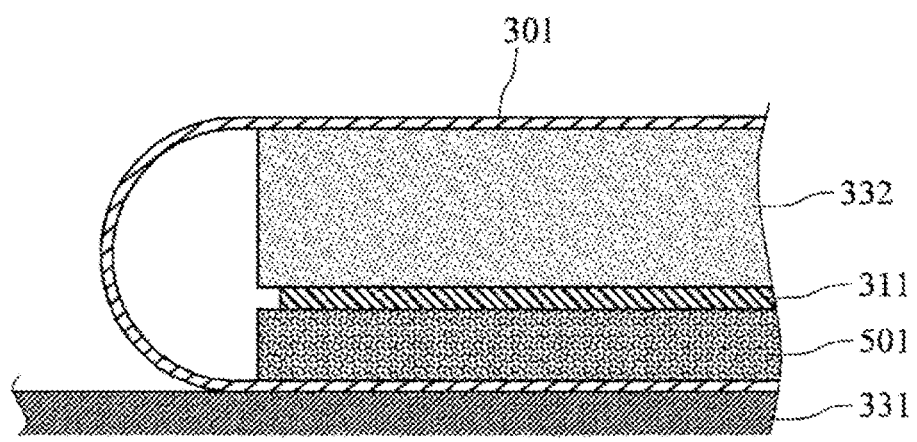
FIG. 5 is a schematic cross-sectional view showing an example of the radiation noise suppression structure according to an embodiment of the present invention.

FIG. 5 is a schematic diagram showing a cross section of a portion where the flat cable 301, the supporting member 332 and the conductor plate 311 overlap, taken along the direction of reciprocating movement of the carriage 122. As shown in FIG. 5, the flat cable 301 is disposed on the bottom of the casing 331, and the upper surface of the flat cable 301 on the main controller board 401 side from the aforementioned intermediate position is entirely covered by a fixing member 501. The fixing member 501 is a non-conductive resin member, and is fixed to the bottom of the casing 331. The conductive plate 311 supported by the supporting member 332 is disposed in contact with the upper surface of the fixing member 501. The flat cable 301 on the side of the board 302, which is mounted on the carriage 122, from the intermediate position is in contact with an upper surface of the supporting member 332 by its own weight.

As shown in FIG. 3, the conductive plate 311 is supported by the supporting member 332 such that a portion of the conductive plate 311 overlaps the upper side of the casing 321 of the image forming portion 140. In the overlapping portion, elastic members 312 that electrically connect the conductive plate 311 and the casing 321 (ground member) are disposed at two locations, respectively. In the present embodiment, compression coil springs are used as the elastic members 312.

Figure 6:
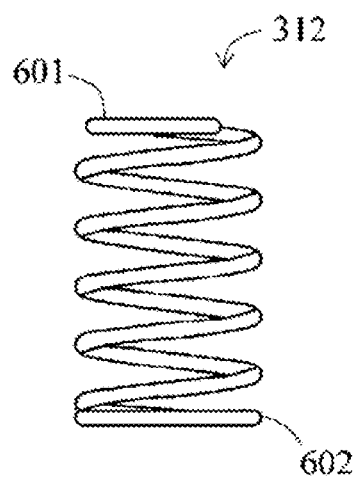
FIG. 6 is a diagram showing an example of an elastic member according to an embodiment of the present invention.

As shown in FIG. 6, a compression coil spring serving as the elastic member 312 has a pick tail end 601 at one end thereof and a closed end 602 at the other end thereof, and the closed end 602 comes into contact with the casing 321. In the present embodiment, as shown in FIG. 3, the pick tail end 601 is fixed to the conductive plate 311 with a screw 313. As described above, the multifunction peripheral 100 is configured such that the conductive plate 311 fixed to the casing 331 of the image reading portion 120 and the casing 321 of the image forming portion 140 are connected with the elastic member 312, and thus the image forming portion 140 and the image reading portion 120 are not fixedly coupled. Accordingly, with this configuration, it is possible to suppress propagation of vibration between the image forming portion 140 and the image reading portion 120 while achieving a stable electrical connection. Needless to say, the other coupling portions that couple the image reading portion 120 and the image forming portion 140 also have the structure that suppresses propagation of vibration.

The elastic member 312 of the present embodiment has a substantial inductance component, and is configured to electrically connect the conductive plate 311 and the casing 321 via the inductance. As a result of grounding the conductive plate 311 via an inductance component in this way, it is possible to suppress radiation noise caused by the synchronization signal (clock signal) propagating through the flat cable 301.

Details of the principle for obtaining such an advantageous effect are not known, but can be estimated as follows. In the frequency band (e.g., in the order of MHz to GHz) of radiation noise that needs to be suppressed, the above-described elastic member 312 serves as an equivalent circuit in which a series connection portion between the inductance component L and resistance component R of the elastic member 312 and a parasitic capacitance Cp generated due to the structure of the elastic member 312 and the structure of the surrounding of the elastic member 312 are connected in parallel. Such an equivalent circuit has a self-resonant frequency of $f0=1/2\pi(LCp)^{1/2}$. The impedance monotonously increases until the frequency reaches the self-resonant frequency f0, and monotonously decreases when it exceeds the self-resonant frequency f0. By using such an elastic member 312 to electrically connect the conductive plate 311 and the casing 321, which is a ground member, the conductive plate 311 is not completely grounded, and thus the portion composed of the conductive plate 311 and the elastic member 312 also self-resonates at a specific self-resonant frequency f1.

Also, as shown in FIG. 5, the conductive plate 311 and the flat cable 301 face each other via the resin supporting member 332 and the resin fixing member 501, and the conductive plate 311 and metal conductors constituting the flat cable 301 form a capacitor. Accordingly, electromagnetic waves propagate from the flat cable 301 to the conductive plate 311 via the capacitor. When such electromagnetic waves flow into the ground member, the electromagnetic waves having a frequency near the above-described self-resonant frequency f1 are considered to be consumed by self-resonance.

The radiation noise generated by the synchronization signal propagating through the flat cable 301 occurs not only at a frequency of the synchronization signal but also over various frequencies. This is presumably because the synchronization signal is not perfectly sinusoidal, but includes a signal having a frequency other than the frequency of the synchronization signal and higher harmonics thereof, and the signals of these frequency components are radiated not only from the flat cable 301 but also radiated via the other conductor portions of the device. The configuration of the present embodiment causes, when the signals are radiated via the other conductors, the signals to be actively passed through the portion composed of the conductive plate 311 and the elastic member 312 so as to consume energy, and thereby, radiation noise can be suppressed.

According to this principle, the self-resonant frequency f1 can be changed by changing the magnitude of the inductance component or parasitic capacitance component of the elastic member 312, and the impedance to a specific frequency range can be changed. That is, it can be said that in order to change the signal level of radiation noise by the elastic member 312, the elastic member 312 is required to have an inductance component on the order that can change the impedance between the flat cable 301 and the ground member (the casing 321) to a degree that the signal level of the radiation noise can be varied. Accordingly, "to have a substantial inductance component" means to have an inductance component in the order that can change the impedance to the frequency of the radiation noise that needs to be suppressed, between the flat cable 301 and the ground member (the casing 321) to a degree that the signal level of the radiation noise can be varied.

Figure 7A:
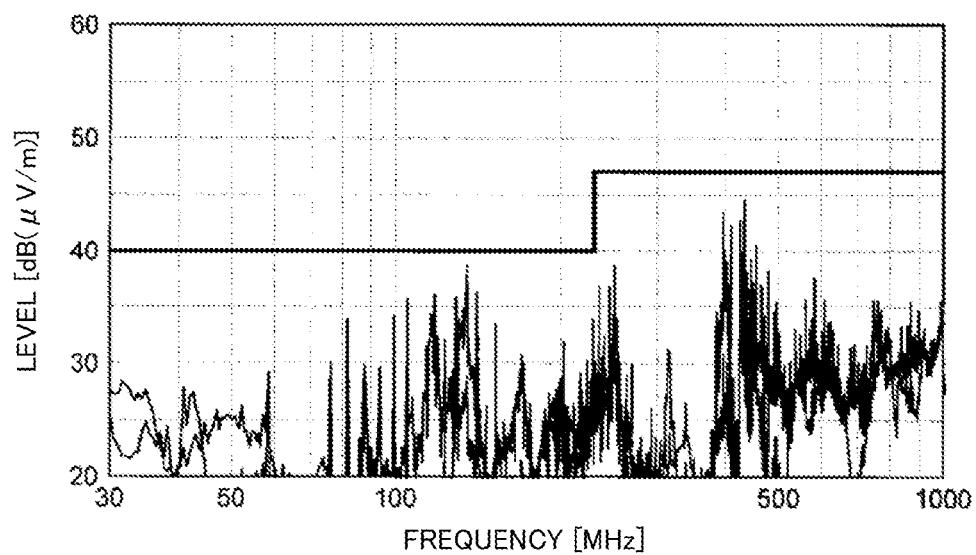
FIG. 7A is a diagram showing an example of the effect of suppressing radiation noise according to an embodiment of the present invention.
Figure 7B:
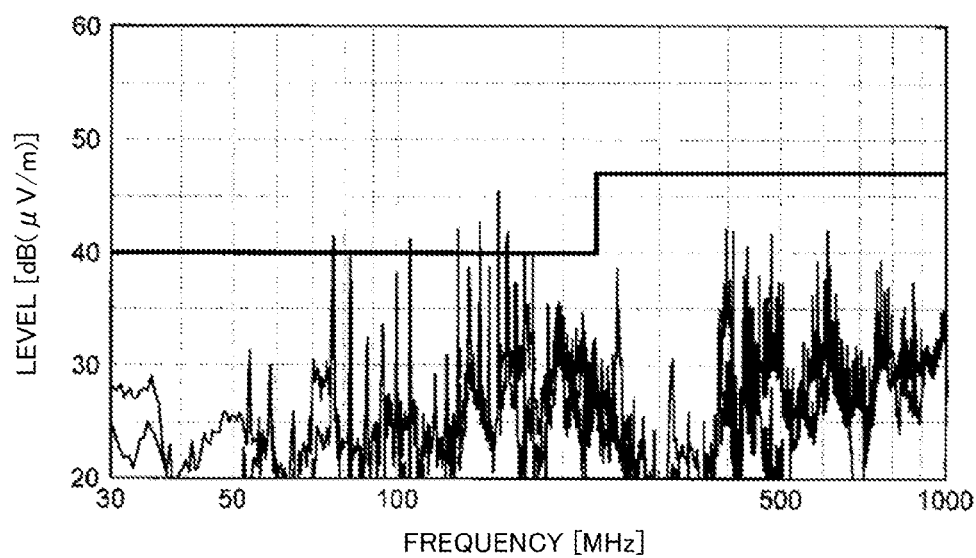
FIG. 7B is a diagram showing a state in which the effect of suppressing radiation noise according to an embodiment of the present invention is not obtained.

FIGS. 7A and 7B are diagrams illustrating the effect of suppressing radiation noise according to the present embodiment. FIG. 7A corresponds to the configuration of the present embodiment, and FIG. 7B shows a configuration in which the conductive plate 311 and the casing 321 are connected by, instead of the elastic member 312 of the present embodiment, an aluminum tape (thickness: 110 μm) that does not have a substantial inductance component and has a width equal to the outer diameter of the compression coil spring.

In this example, the conductive plate 311 is made of a SPTE (tin) plate having a thickness of 0.3 mm. The fixing member 501 is made of ABS resin (acrylonitrile-butadiene-styrene resin) and has a thickness of 1 mm. The supporting member 332 is made of ABS resin and has a thickness of 2.2 mm. In the flat cable 301, the conductor thickness is 35 μm, the conductor width is 0.7 mm, and the conductor pitch is 1 mm. The number of conductors is 30, and the thickness is 0.12 mm (thickness of a plastic film≈42 μm). The compression coil spring serving as the elastic member 312 is made of a stainless steel wire (SUS304-WPB) having a diameter of 1 mm. The outer diameter is 12.7 mm, and the effective number of turns is 5 (7 in total). In the state shown in FIG. 6, the compression coil spring has a free length of 21 mm, and the length in a state in which the compression coil spring is disposed between the conductive plate 311 and the casing 321 is 15.4 mm (load: 6 N).

In FIGS. 7A and 7B, the horizontal axis corresponds to the frequency, and the vertical axis corresponds to the intensity of radiation noise. The acquisition of radiation noise is carried out in a state in which a synchronization signal (voltage: 3.3 V) having a frequency of 5.85 MHz is continuously output from the main controller board 401 to the board 302. The measuring method is based on the standard EN55022 (3 m method) for information processing equipment according to European electromagnetic compatibility (EMC) directives. That is, the distance between a turn table on which equipment to be measured is placed and a measurement antenna is 3 m, and the measurement frequency is 30 to 1000 MHz. In FIGS. 7A and 7B, the class B limit of EN55022 (30 MHz or more and less than 230 MHz: 40 dBpV/m or less, 230 MHz or more and 1000 MHz or less: 47 dBpV/m or less) is indicated by the thick line.

As shown in FIG. 7B, it can be seen that in the case where the conductive plate 311 and the casing 321 are connected by an aluminum tape that does not have a substantial inductance component, the radiation noise exceeds the limit of the standard in a range of 70 MHz to 200 MHz. That is, it indicates that simply applying a ground potential to the conductive plate 311 cannot suppress radiation noise.

On the other hand, as shown in FIG. 7A, it can be seen that in the case where the elastic member 312 made of a compression coil spring is disposed at two locations so as to connect the conductive plate 311 and the casing 321 as in the present embodiment, it is possible to suppress the radiation noise that would exceed the limit of the standard in a range of 70 MHz to 200 MHz.

The frequency band of radiation noise to be suppressed can be adjusted by changing the inductance or parasitic capacitance, or in other words, by changing the structure and the number of elastic members 312 disposed. For example, in the above-described configuration, the state of radiation noise measured changes between the case where the number of the elastic members 312 is one and the case where the number of the elastic members 312 is three. When a compression coil spring is used as the elastic member 312, the frequency band of radiation noise to be suppressed can be changed by changing the length, thickness, material or the like of the spring. Also, the parasitic capacitance can be changed by changing the arrangement of the conductor plate 311 (the material or thickness of the supporting member 332 or the fixing member 501). However, from the viewpoint of ease of adjustment, it is preferable to perform the adjustment with only the elastic member 312.

In the description given above, a compression coil spring is used as the elastic member 312, but it is possible to use any configuration that has a substantial inductance and is capable of absorbing vibration generated in the image forming portion 140 or the image reading portion 120. For example, the use of springs other than a compression coil spring such as a torsion spring and a plate spring is not excluded. Furthermore, an elastic body other than a spring can be used as long as the same advantageous effect can be obtained. Also, in the above description, a box-shaped casing is used as the ground member, but a board such as a sheet metal that separates a space in which the charger 142 and the like are disposed and a space in which digital circuitry is disposed can also be used as the ground member.

As described above, in the multifunction peripheral 100, with a relatively simple configuration of disposing the conductive plate 311 and the elastic member 312, the radiation noise caused by the flat cable 301 can be suppressed. Also, the elastic member 312 is used to connect the conductive plate 311 provided in the image reading portion 120 and the ground member provided in the image forming portion 140. Thus, vibration generated in the image forming portion 140 or the image reading portion 120 can be absorbed, and the reduction in the image forming quality caused by propagation of the vibration can be prevented. Also, the configuration can be achieved at low cost because of its simplicity.

Note that the embodiment described above is not intended to limit the technical scope of the present invention. Accordingly, various modifications and applications other than those described above are possible within the scope of the present invention. For example, in the embodiment described above, a CIS image reading apparatus including one carriage having an image sensor is used as an example. However, the present invention is also applicable to an image reading apparatus that includes a reduction optical system (so-called CCD system) that includes a first carriage including a light source and a mirror and a second carriage including two mirrors, and is configured to form an image of a document placed on the document platen on an image sensor fixed outside the carriage by the movement of the first and second carriages.

Also, in the embodiment described above, because the radiation noise increases significantly when portions of the flat cable 301 face each other, this state is used as the home position (or the position of the carriage 122 when reading a document conveyed by the document feeder 110). However, the present invention may also be applied to a configuration in which portions of the flat cable do not face each other at the home position, but portions of the flat cable face each other when reading a document.

In addition, in the embodiment described above, the present invention is embodied as a digital multifunction peripheral, but the present invention is applicable to any image forming apparatus including an image reading portion and an image forming portion.

The invention claimed is:

1. An image forming apparatus comprising:
an image reading device configured to read a document image with a scanning optical system; and
an image forming device configured to print the document image read by the image reading device onto a receiving material,
wherein the image forming device includes a conductive ground member, and
the image reading device includes:
a non-conductive casing configured to support a document platen on which a document is placed;
a carriage that is accommodated in the casing and is provided so as to be capable of reciprocating movement with respect to the document platen;
a flat cable that is disposed along a direction of the reciprocating movement of the carriage and is configured to input a synchronization signal into a board mounted on the carriage;
a conductive plate that is supported by the casing such that, when portions of the flat cable face each other as a result of the flat cable being bent according to the reciprocating movement of the carriage, the conductive plate is interposed between the facing portions of the flat cable; and
an elastic member that is configured to electrically connect the conductive plate and the ground member, and has a substantial inductance component that absorbs vibration generated in the image forming device or the image reading device, wherein
the conductive plate and the flat cable constitute a capacitor,
an upper surface of the flat cable that is closer to a standby position of the carriage than an intermediate position of a range of reciprocating movement of the carriage, is covered by a non-conductive fixing member, and
the conductive plate is supported by an undersurface of a non-conductive supporting member, and disposed between the supporting member and the fixing member.

2. The image forming apparatus according to claim 1, wherein the elastic member is a compression coil spring.

3. The image forming apparatus according to claim 1, wherein when the carriage is in a standby state for reading an image, the portions of the flat cable face each other with the conductive plate interposed therebetween.

4. The image forming apparatus according to claim 1, further comprising a document feeder configured to convey a document to the image reading position,
wherein, when the carriage is located at a position corresponding to the image reading position, the portions of the flat cable face each other with the conductive plate interposed therebetween.

5. The image forming apparatus according to claim 1, wherein the conductive plate and the elastic member are disposed such that radiation noise having a frequency of 30 MHz or more and less than 230 MHz caused by the flat cable is less than or equal to the class B limit of the electromagnetic compatibility (EMC) standard EN55022 for information processing equipment.

6. The image forming apparatus according to claim 1, wherein the flat cable is in contact with an upper surface of the supporting member and an undersurface of the fixing member.

* * * * *